Dec. 11, 1934.  C. W. DAKE  1,983,839
METHOD OF MANUFACTURING A BRAKE DRUM
Filed Jan. 15, 1934  2 Sheets-Sheet 1

INVENTOR
Charles W. Dake
BY
Liverance & Van Antwerp
ATTORNEYS

Dec. 11, 1934.  C. W. DAKE  1,983,839
METHOD OF MANUFACTURING A BRAKE DRUM
Filed Jan. 15, 1934  2 Sheets-Sheet 2
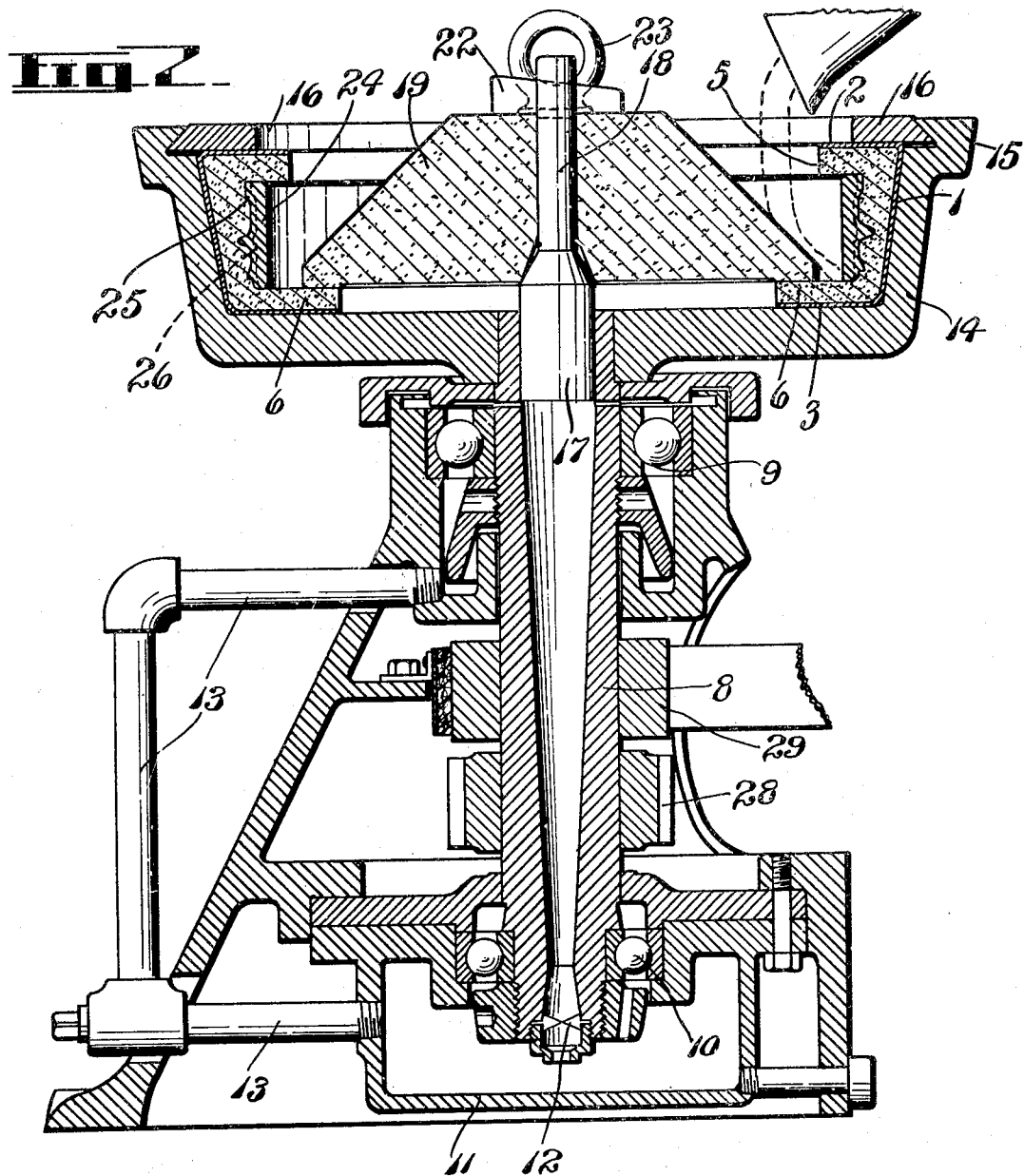
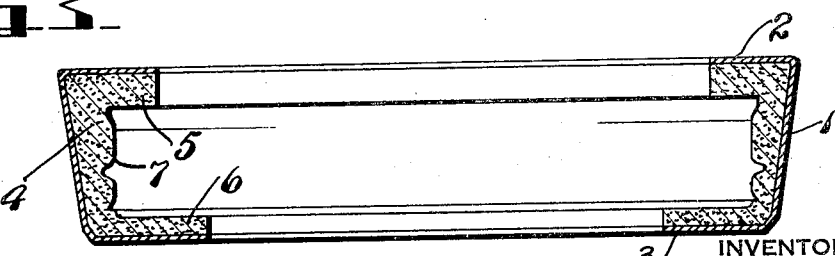
INVENTOR
Charles W. Dake
BY
Liverance and Van Antwerp
ATTORNEYS Patented Dec. 11, 1934

1,983,839

UNITED STATES PATENT OFFICE 1,983,839

METHOD OF MANUFACTURING A BRAKE DRUM

Charles W. Dake, Grand Haven, Mich., assignor to Campbell, Wyant & Cannon Foundry Company, Muskegon Heights, Mich., a corporation of Michigan Application January 15, 1934, Serial No. 706,693

6 Claims. (Cl. 22—201)

This invention relates to brake drums, such as are used extensively on motor vehicles or similar vehicles, and to a novel method of producing the same. Particularly the invention relates to the braking ring or flange portion of a brake drum and a novel method of producing the same by centrifugal casting. The objects of the invention are to cast centrifugally the braking ring or flange of a brake drum of a metal alloy such that the brake flange will have the desirable soft positive braking characteristics inherent in cast iron. It is a further object to produce a brake drum flange or ring that will have the required strength against braking or fracture from sudden shock without at the same time necessitating use of too great an amount and weight of metal.

Further objects of the invention are to produce the brake drum ring or flange with a non-porous braking surface and free from pitting or other defects, and one in which the braking ring or flange produced may readily have a supporting back of rolled, pressed or drum metal readily attached thereto.

An understanding of the invention and of the various objects enumerated, as well as others not at this time stated, may be had from the following description, taken in connection with the accompanying drawings, in which, Fig. 1 is a section taken centrally through a brake drum produced in accordance with the present invention.

Fig. 2 is a vertical section of one form of apparatus by means of which the invention is carried out and the brake drum ring or flange cast.

Fig. 3 is a vertical section taken diametrically of an annular mold in which the drum ring or flange is cast, the interior of the mold conforming to the desired exterior form of the brake drum flange.

Like reference characters refer to like parts in the different figures of the drawings.

Figure 1:
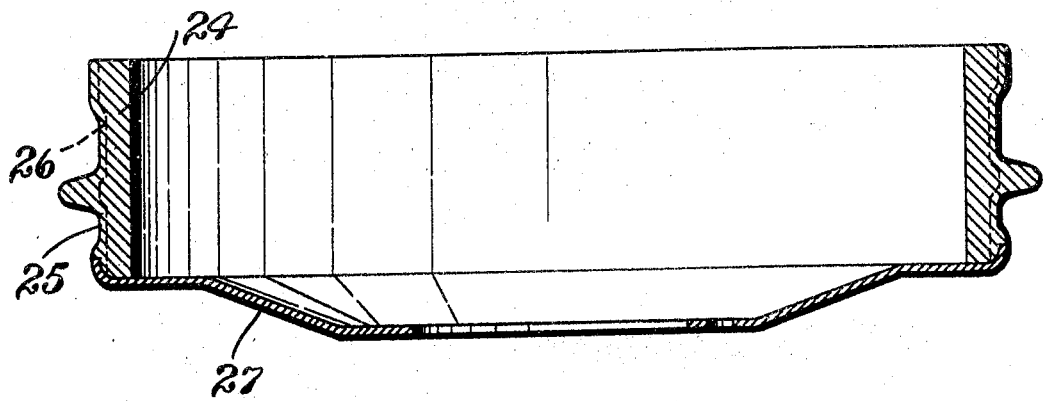

The mold, shown in Fig. 3, in which the brake drum ring or flange is cast, has an outer sheet metal annular ring portion 1 from which upper and lower annular flanges 2 and 3 are bent inwardly horizontally as shown. The curved annular portion 1 tapers outwardly from its lower to its upper edge and the flange 3 extends inwardly farther than the flange 2. Within this supporting member described, a baked sand mold is made, having sections 4, 5 and 6 conforming generally to the shape of the sheet metal supporting member around it. The mold flanges 5 and 6 extend to the inner edges of the flanges 2 and 3, respectively. The inner surface 7 of the mold is of a shape conforming to the desired outer shape of the brake drum ring to be cast, and may have annular grooves and depressions therein to provide annular ribs and corresponding thicker portions of metal on the cast brake drum ring.

One form of apparatus with which the mold is used and by means of which the casting is formed is shown in Fig. 2. It includes a vertical spindle 8 mounted in suitable upper and lower bearings 9 and 10, the lower one of which is located immediately above an oil reservoir 11. The shaft 8 is hollow and has a propeller member 12 in its lower end, the effect of which, when the shaft is rotating, is to propel oil from the reservoir 11 upwardly to the interior of the shaft and, the same tapering outwardly in a vertical direction, the oil is carried to near the upper end of the shaft and then passes through horizontal openings to the upper bearing 9. Excess oil is drained back to the reservoir 11 through the pipes 13. The lower bearing 10 is lubricated by reason of its close proximity to the oil reservoir and the vertical openings in the lower securing nut which holds the bearing in place.

At the upper end of the shaft 8 above the support for the shaft and bearings, an annular metal flask 14 is secured to rotate with the shaft. Its free upper edge portion is horizontally extended, as at 15, and said part 15 is provided with an undercut annular groove in which retaining segments 16 may be seated to hold the mold in the flask and securely bind it in place through the tendency of the segments 16 to move outwardly under centrifugal force and thus wedge into the undercut groove. The mold fits within the flask, the inner sides of which are shaped in conformity with the taper of the part 1 of the sheet metal supporting member of the mold.

Figure 4:
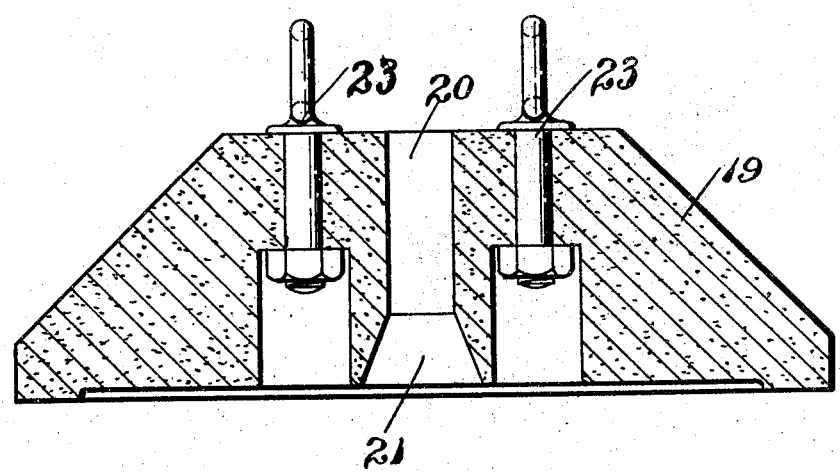
Fig. 4 is a vertical sectional view of a refractory fluid metal distributor used in the casting process.

A locating post for a metal distributor has an enlarged lower end portion 17 secured in the upper end of the shaft 8, and an upwardly extending upper portion 18 of smaller diameter over which the metal distributor 19 is placed. The distributor 19 has a central opening with upper and lower portions 20 and 21 conforming to the parts of the locating member over which they are placed. A wedging key 22 passes through the upper end of the part 18 and bears against the upper side of the distributor 19 to securely hold it in place. Eye bolts 23, spaced apart and secured to the distributor, as shown in Fig. 4, serve as a means for handling the distributor which becomes highly heated in operation. The rings or eyes at the upper ends of the eye bolts 23 provide a convenient means for handling.

The distributor is located centrally of the mold, closes the open lower side thereof and is of a substantially frustro-conical form. The molten metal poured into the mold is directed by the downwardly and outwardly inclined sides of the distributor member 19 against the inner sides of the sand mold, which preferably after being formed is baked so as to provide a mold of a dry sand character.

The molten metal poured into the mold is an alloy consisting preferably principally of two metal constituents. An example may be furnished by an alloy of iron and copper. The metal in a molten state and, preferably heated considerably above its melting temperature, is poured into the rotating mold. Through centrifugal action the metal rises against and covers the inner substantially vertical face of the mold but cannot rise above the overhanging annular flange 5. It fills all of the grooves and depressions in the inner surface of the mold. The shaft 8 and the flask 14 attached thereto are rotated at high speed. A peripheral speed of the molten metals of substantially 3000 feet per minute has the effect of causing the two metals of different specific gravity, cast iron and copper, to separate, the heavier metal going to the outside. If the speed is increased to a peripheral speed of the metals of 5000 feet per minute, there will be a very nearly complete separation of the copper and cast iron, whereby there will be produced a casting, the inner annular portion 24 of which is of cast iron, the outer annular portion 25, including the projecting annular ribs thereon, of copper and at the junction of the two, indicated by dotted lines at 26, there will be no sharp separation of the metals but an intermediate zone where the two are intimately mingled. In practice the quantity of copper used should not exceed 15% of the mass of metal.

The temperature of the molten metal may range from 2300° F. to 3000° F. when an alloy of cast iron and copper is used as described. Copper melts at 1981.4° F. and cast iron from 1900° to 2200° F., depending upon the composition of the cast iron. At 2300° F. all of the metal will be melted, and heated somewhat above melting temperature. Preferably, the temperature should be sufficiently above the melting point that the molten metals will remain in a freely fluid state for a period of time during the operation such that there can be ready separation under the centrifugal forces operating upon them, and there not be too rapid a solidification such that any solidifying or thickening of the molten metals would interrupt the separation. In addition any gases, impurities, slag or the like should be enabled to pass with freedom through the molten metal to the inner surface of the ring casting and thus eliminate any possibility of defects, such as porosity or trapped slag or other impurities in the cast iron which would detrimentally affect the braking surface of the cast iron after it has been machined at the inner curved surface of the casting produced. For these reasons the use of a temperature in pouring but little above the temperature at which the metals will be all melted is to be avoided, and considerably higher than mere melting temperature used.

The drum thus produced, using cast iron and copper as the metals, has an inner braking face of cast iron and an outer supporting shell of copper which is not brittle like cast iron but has the property of toughness and strength. The brake drum ring produced therefore combines the desired soft, yet positive braking characteristics of cast iron without the necessity of using an undue weight of metal which would be needed if cast iron alone was used, the copper shell providing the necessary toughness and tensile strength to insure the drum against breaking under shock.

As previously described the extent of separation is governed by the rotative speed. The higher speeds, which produce a peripheral speed of substantially 5000 lineal feet per minute of the molten metal, are better than the lower speed of 3000 lineal feet per minute peripheral speed because of the greater separation of the cast iron and copper; and there will be proportional greater or less separation as the speed is increased or diminished. What is the best speed may be determined by test and experience.

It is to be understood that while a specific example of two metals like cast iron and copper has been given the invention is in nowise limited to the use of such two metals alone. Other metals may be used together, that is, preferably other metals than copper with cast iron for brake drum purposes. And for other purposes wherein the inner material does not necessarily have to be of cast iron other suitable metal for the desired purpose may be used in its place. Such different metals with their differing specific gravities will require a speed of rotation in correspondence with the differences in specific gravity. If the two metals are nearer together in specific gravity than are copper and cast iron, the speed of rotation will need to be increased. If they are farther apart in specific gravity the speed of rotation can be reduced so as to get the desired effective separation. It is further to be understood that while the temperature should preferably be considerably above the temperature at which the metals will be wholly molten, when cast iron is used as one of the metals and the other metal has a melting point like copper of substantially 2000° F. the composition of the cast iron will be controlling as to its melting point, and the temperature of the composite mixture when poured into the mold can be lower for a low temperature melting cast iron than for a high temperature melting cast iron. Also a high phosphorous content in cast iron renders the same much more fluid than one using low phosphorous content and the temperature to which the composite mixture of molten cast iron and copper is raised for pouring into the mold may be less with the high phosphorus iron than with the low phosphorus iron. It is for this reason that a temperature range from 2300° to 3000° F. has been specified in order to cover the differing characteristics of differing cast irons as to melting points and fluidity after melting.

After the composite brake drum has been cast it may be supplied with a back 27 of wrought, rolled or pressed steel which is welded or otherwise suitably permanently secured to the ring as shown in Fig. 1.

The apparatus shown in Fig. 2 is driven in a suitable manner through gearing connected with the gear 28 on the shaft 8. A brake 29 on the shaft with a cooperating brake band may be used to quickly stop the rotation at the end of a casting operation. The apparatus described is one apparatus only of which may be used and the invention is in nowise limited to any particular specific apparatus for carrying out the process described.

Having described my invention what is claimed is:

1. The herein described method which consists, in providing a mold for a brake drum ring or flange, rotating the same and depositing a molten mixture of iron and copper therein, wherein the copper does not exceed 15% of the mass and is at least 3% of the mass, and revolving the mold at a sufficient speed to cause a separation of the molten copper and molten iron, the copper of heavier specific gravity than the iron moving outwardly towards the mold.

2. The herein described method of producing brake drum rings which consists in providing a suitable mold for a ring adapted to be rotated, mounting said mold for rotation, depositing therein molten iron and copper wherein the copper varies between 3% and 15% of the mass, and rotating the mold and molten metal at a sufficiently high speed to cause substantially complete separation of the molten copper from the molten iron.

3. The method of producing a brake drum which consists in providing a mold for a cylindrical brake drum ring, mounting said mold for rotation about its central axis, depositing therein a mixture of molten cast iron and copper at a temperature materially exceeding the melting temperature of said cast iron, the percentage of copper being between 3% and 15%, and rotating the mold at high speed sufficient to cause a substantially complete separation of the molten iron and molten copper due to centrifugal action, whereby a composite brake drum ring is produced having an inner braking portion of cast iron and an outer reinforcing and supporting portion of copper.

4. The method comprising the steps defined in claim 3 for producing a brake drum ring, and then attaching thereto a wrought metal back at one edge thereof.

5. The method comprising the steps defined in claim 3 for producing a brake drum ring, and then attaching to the copper constituent at one edge of the ring, a wrought metal back.

6. The method of producing a braking flange or ring for brake drums which consists in providing a suitable cylindrical mold, rotating the same and depositing an alloy of molten cast iron and copper therein, the copper content being between 3% and 15%, the temperature of the molten mixture of metals being above 2300° F. and not exceeding 3000° F., and rotating the mold at high speed to produce a linear speed for the molten metals of between 3000 and 5000 feet per minute.

CHARLES W. DAKE.